(12) United States Patent
Duvekot et al.

(10) Patent No.: US 12,552,574 B2
(45) Date of Patent: *Feb. 17, 2026

(54) SYSTEM ADAPTED TO PROMOTE RE-UTILIZATION OF A REJECTED CONTAINER LOADED WITH CONTENT

(71) Applicant: Altria Client Services LLC, Richmond, VA (US)

(72) Inventors: Loren Duvekot, Goochland, VA (US); James D. Evans, Chesterfield, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/894,356

(22) Filed: Sep. 24, 2024

(65) Prior Publication Data

US 2025/0011027 A1  Jan. 9, 2025

Related U.S. Application Data

(60) Continuation of application No. 18/297,930, filed on Apr. 10, 2023, now Pat. No. 12,103,726, which is a
(Continued)

(51) Int. Cl.
*B65B 69/00* (2006.01)
*B65B 29/00* (2006.01)
(Continued)

(52) U.S. Cl.
CPC .............. *B65B 69/00* (2013.01); *B65B 29/00* (2013.01); *B65B 55/24* (2013.01); *B65B 65/003* (2013.01)

(58) Field of Classification Search
CPC .......... B65B 1/46; B65B 19/30; B65B 29/00; B65B 55/24; B65B 65/003; B65B 69/00; B65B 69/005; B65B 69/0058; B65G 29/00; B65G 29/02; B65G 47/248; B65G 47/252; B65G 65/23; A24B 3/00; A24F 23/00
(Continued)

(56) References Cited

U.S. PATENT DOCUMENTS 1,366,449 A   1/1921 Hallock
1,556,048 A  10/1925 Thompson
(Continued)

FOREIGN PATENT DOCUMENTS

DE    3636149 A1   4/1988
DE   10353711 A1   6/2005
(Continued)

*Primary Examiner* — Stephen F. Gerrity
(74) *Attorney, Agent, or Firm* — Harness, Dickey & Pierce, P.L.C.

(57) ABSTRACT

A high-speed automated separation apparatus includes a pair of flexible discs, a driver to rotate the flexible discs, a feeder to position a rigid body at a first location between the flexible discs, a spreader and a converger operable upon the flexible discs such that opposing portions of the flexible disc converge upon the positioned rigid body. The rotating flexible discs rotate the rigid body beyond the first location, and content from the rigid body is expelled. The rigid body and the expelled content are then available for reuse.

19 Claims, 4 Drawing Sheets

Related U.S. Application Data continuation of application No. 17/569,726, filed on Jan. 6, 2022, now Pat. No. 11,623,779, which is a division of application No. 16/708,990, filed on Dec. 10, 2019, now Pat. No. 11,242,171, which is a division of application No. 15/359,984, filed on Nov. 23, 2016, now Pat. No. 10,518,921.

(60) Provisional application No. 62/259,915, filed on Nov. 25, 2015.

(51) Int. Cl.
 *B65B 55/24* (2006.01)
 *B65B 65/00* (2006.01)

(58) Field of Classification Search
 USPC ........... 53/53, 54, 381.1; 198/402, 403, 406, 198/408, 608, 624; 414/413, 418, 419
 See application file for complete search history.

(56) References Cited

U.S. PATENT DOCUMENTS

| | | |
|---|---|---|
| 1,568,081 A | 1/1926 | Mitton |
| 2,427,659 A | 9/1947 | Collyer |
| 2,524,656 A | 10/1950 | Eyster |
| 2,590,704 A | 3/1952 | Howard et al. |
| 2,726,779 A | 12/1955 | Kendall |
| 2,735,561 A | 2/1956 | Doren |
| 2,936,917 A | 5/1960 | Musgrave |
| 2,948,425 A | 8/1960 | Copping |
| 2,982,985 A | 5/1961 | Hohenadel et al. |
| 3,002,605 A | 10/1961 | Schlichting |
| 3,181,710 A | 5/1965 | Schmidt |
| 3,244,304 A | 4/1966 | Pollak et al. |
| 3,310,187 A | 3/1967 | Barker et al. |
| 3,372,804 A | 3/1968 | Puoti |
| 3,481,465 A | 12/1969 | Way |
| 4,642,016 A | 2/1987 | Bucher et al. |
| 5,275,523 A | 1/1994 | Stewart et al. |
| 5,421,690 A | 6/1995 | Litterst |
| 5,442,892 A | 8/1995 | Burns, III et al. |
| 5,568,715 A | 10/1996 | Ebel et al. |
| 6,398,008 B1 | 6/2002 | Suga |
| 10,518,921 B1 | 12/2019 | Duvekot et al. |
| 11,242,171 B2 | 2/2022 | Duvekot et al. |
| 11,623,779 B2 | 4/2023 | Duvekot et al. |
| 12,103,726 B2 * | 10/2024 | Duvekot et al. ........ B65B 69/00 |
| 2010/0003114 A1 | 1/2010 | Mather |
| 2017/0081052 A1 | 3/2017 | Aichinger et al. |

FOREIGN PATENT DOCUMENTS

| | | |
|---|---|---|
| FR | 2950615 B1 | 12/2011 |
| GB | 2250969 A | 6/1992 |

\* cited by examiner

SYSTEM ADAPTED TO PROMOTE RE-UTILIZATION OF A REJECTED CONTAINER LOADED WITH CONTENT

CROSS-REFERENCE TO RELATED APPLICATIONS

This application is a continuation application of U.S. application Ser. No. 18/297,930, filed Apr. 10, 2023, now U.S. Pat. No. 12,103,726, which is a continuation application of U.S. application Ser. No. 17/569,726, filed Jan. 6, 2022, now U.S. Pat. No. 11,623,779, which is a divisional application of U.S. application Ser. No. 16/708,990, filed Dec. 10, 2019, granted as U.S. Pat. No. 11,242,171 on Feb. 8, 2022, which is a divisional application of U.S. application Ser. No. 15/359,984, filed Nov. 23, 2016, granted as U.S. Pat. No. 10,518,921 on Dec. 31, 2019, which claims priority to U.S. Provisional Application Ser. No. 62/259,915, filed on Nov. 25, 2015, the contents of each of which are hereby incorporated by reference in their entirety.

FIELD

This disclosure relates generally to systems and method of separating rigid open ended containers from their content, and, more particularly with methods and apparatus capable of emptying open containers filled with units of smokeless tobacco in a manner facilitating reuse of the container and/or the smokeless tobacco.
Environment Various forms of smokeless tobacco, including moist snuff smokeless tobacco ("MST") and pouched smokeless tobacco ("snus") are provided to the consumer in a lidded cylindrical container (a can) comprising an open ended base (cup) constructed of a metal, paperboard or plastic and a conforming lid. Pouched snus may comprise a serving of tobacco encased in paper.

Canned product containing these various forms of smokeless tobacco are manufactured at high speeds using automated can loading machinery whose output may be subject to one or more automated quality control checks such as whether a freshly produced can meets a weight standard or the like. An example of such systems can be found in the teachings of a commonly assigned US patent publication 2014/0047804.

Other quality control criteria may include checks of moisture level of the content or visual characteristics, such an absence of scuffs, marks or stray bits of content on the container.

It is desirable to remove non-conforming product from the output of a loading operation in a way that promotes reutilization (reclamation) of the components, i.e., the container can and its content.

It would also be desirous that such a capability could be performed at high speeds and in an automated manner such that the rate of reclamation can keep up with output of the loading apparatus, especially at start-up or at a first instance of addressing a malfunction of a loader, where all the output of the loader might be rejected and need reclamation.

It would also be desirous that such a reclamation capability could be performed across a wide range of rates at which non-conforming product is detected and removed from the output of a loader, that being almost zero when the loader is operating properly, to possibly all its output at start up.

SUMMARY

In accordance with the teachings which follow, there is provided an apparatus operative to separate a rigid body from its content, comprising: a pair of opposing flexible discs, the discs being spaced apart by distance proximate of a nominal dimension of the rigid body; a driver operative to rotate the pair of opposing flexible discs; a continuous feeder operative to position a rigid body between the opposing flexible discs at a first location along an arcuate path while orienting the rigid body such that an open end portion of the rigid body is in a radially outward relation to the rotating flexible discs; a spreader at a second location upstream of the first location and operative to spread apart opposing portions of the rotating flexible discs, the spreader establishing a spacing between the opposing portions at the second location greater than the nominal dimension of the rigid body; a converger at a third location along the arcuate path downstream of the first location and operative to converge opposing portions of the rotating flexible discs, the converger establishing a spacing between the opposing portions at the third location not greater than a nominal dimension of the rigid body; whereby, between the second and third locations, the opposing portions of the rotating flexible discs mutually converge into contact with side portions of a rigid body positioned at the first location to hold the rigid body between the rotating flexible discs, whereupon the rotating flexible discs rotate the rigid body in the orientation beyond the first location and content from the rigid body is expelled along a first arcuate path portion downstream of the first location; and an ejector operative to remove the rigid body from between the opposing flexible discs at a fourth location downstream of the first arcuate path portion.

The apparatus may further comprise a stabilizer operative to maintain the orientation of the rigid body at and beyond the first location. The stabilizer may comprise a stabilizer disc of a diameter less than a diameter of the rotating flexible discs and be disposed between and rotatable with the rotating flexible discs and may comprise a concentric ring on an inside surface of at least one of the rotating flexible discs. The stabilizer may further comprise a finger extending between the pair of rotating flexible disks at the first location, the finger being spaced radially apart from the stabilizer disc so as to be operative upon an upper edge portion of the rigid body at the first location.

The ejector may comprise a plow and a chute, the plow directing the rigid body away from the grip of the rotating flexible discs and onto the chute.

The apparatus may further comprise a cleaning station operative to clean a surface of the rigid body at location downstream of the first arcuate path portion and/or a receptacle position along the first arcuate path portion to receive the expelled content.

The continuous feeder may comprise a conveyor and a conveyor driver, the conveyor extending in between the rotating flexible discs and operative to deliver the rigid body to the first location. The conveyor driver is operative to continuously drive the conveyor, whereby the apparatus is operative upon a procession of rigid bodies regardless of spacing or an absence of any spacing between members of the procession.

The pair of flexible discs and the stabilizer disc may be mounted upon a common drive shaft so that the spacing between the pair of flexible discs being adjustable to accommodate rigid bodies of different dimensions.

The teachings herein also disclose a method of separating a rigid body from its content, comprising: rotating a pair of spaced apart flexible discs, whereby opposing portions of the rotating flexible discs rotate along an arcuate path; moving the rigid body into a first location along the arcuate path between the pair of rotating flexible discs and orienting an open end portion of the rigid body in a radially outward relation to the rotating flexible discs; gripping the rigid body at the first location with the rotating flexible discs by adjacent the first location, converging the opposing portions of the rotating flexible discs into contact with side portions of the rigid body; expelling content from the rigid body by moving the gripped rigid body with the opposing portions along a first arcuate path portion beyond the first location while maintaining the orientation of the rigid body; after the expelling, releasing the rigid body from the grip between the opposing flexible discs.

The converging may include continuously spreading apart opposing portions of the rotating flexible discs at a second location upstream of the first location and continuously urging together the opposing portions of the rotating flexible discs at a third location downstream of the first location, whereby the opposing portions converge while moving from the second location to the third location.

The opposing portions may be spread apart at the second location by a distance greater than a nominal dimension of the rigid body.

The method may further comprise stabilizing the gripped, rigid body by contacting a bottom portion of the rigid body with a stablilizer disc disposed between the pair of rotating flexible discs. The stabilizing may further include contacting an upper edge portion of the rigid body with a finger extending between the pair of rotating flexible disks at the first location.

The releasing of the rigid body may include plowing the rigid body onto a chute downstream of the first arcuate path portion.

The method may further comprise cleaning a surface of the rigid container at location downstream of the first arcuate path portion.

The method may further comprise collecting the expelled content in a receptacle.

The teachings herein further provide a system adapted to promote re-utilization of a rejected container loaded with content, the system comprising: a source of empty containers; a filling apparatus operative to repetitively fill containers from the source with content; an inspection station operative upon containers filled by the filling apparatus, the inspection station generating a signal when a filled container fails to meet a specification; a rejection station responsive to the signal and operative to direct filled containers that fail to meet the specification away from filled containers that meet the specification, thereby establishing an output of rejected filled containers; a reclamation station arranged to receive the output of the rejection station, the reclamation station comprising a pair of rotating flexible discs, a continuous feed mechanism to feed rejected filled containers to a first location between the rotating flexible discs with an open end portion of the rejected filled container being oriented in a radially outward relation with respect to the rotating flexible discs, the rotating flexible discs adapted to grip each rejected filled container at the first location in succession and to rotate each gripped container beyond the first location to expel content from the gripped container, and an arrangement to remove the emptied containers from the grip of the rotating flexible discs, thereby establishing a first output of expelled content and a separate, second output of emptied containers; and a router operative to return containers of the second output of the reclamation station to the source.

The specification may comprise a weight of a loaded container.

The router may comprise a conveyor and an inverter to change orientation of containers from an orientation of the second output of the reclamation station to an orientation of containers at the source.

The rotating flexible discs may cooperate with a stabilizer operative to maintain the orientation of the container while being gripped by the rotating flexible discs. The stabilizer may comprise a stabilizer disc of a diameter less than a diameter of the rotating flexible discs and be disposed between and rotatable with the rotating flexible discs. The stabilizer may comprise a concentric ring on an inside surface of at least one of the rotating flexible discs. The stabilizer may further comprise a finger extending between the rotating flexible discs at the first location.

The system may further comprise a cleaning station operative to clean a surface of the emptied container before arrival at the source.

The feeder may comprise a conveyor and a conveyor driver, the conveyor extending in between the rotating flexible discs and operative to deliver a container to the first location. The conveyor driver may be operative to continuously drive the conveyor, whereby the reclamation station is operative upon the output of the rejection station regardless of spacing or an absence of any spacing between members of the output of the rejection station.

The rigid body may comprise a bottom portion of an open ended can and the content may comprise smokeless tobacco.

BRIEF DESCRIPTION OF THE DRAWING

Various aspects are further described in the Detailed Description which follows, in reference to the following drawing, by way of non-limiting exemplary embodiments in which like reference numerals represent similar parts throughout the several views of the drawing, wherein.

DETAILED DESCRIPTION OF PREFERRED AND EXEMPLARY EMBODIMENTS

The disclosure provides teachings of systems and methods of filling rigid containers with units of content such as a smokeless tobacco and more particularly, to loading tobacco content into containers in a continuous operation, wherein filled containers failing a criteria-check (such as a weight check) are directed to an automated reclamation station where the content and the containers are separated in a manner facilitating reuse.

Figure 1:
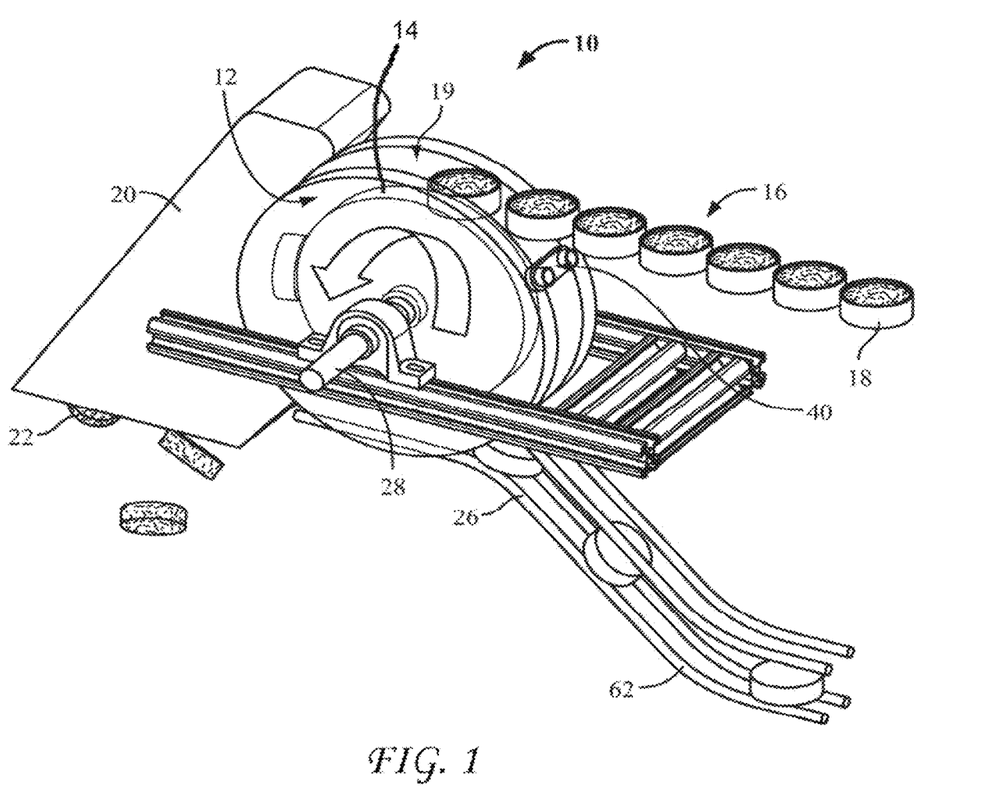
FIG. 1 is a perspective view of an automated separation apparatus having a capacity to separate a rigid container from its content in accordance with an embodiment of this disclosure.

Referring to FIG. 1, there is provided apparatus 10 especially suited for use in an automated reclamation system as described above, comprising a pair of rotatable, flexible discs 12, a stabilizer disc 14 disposed between and preferably rotatable with the flexible discs 12, a first conveyor 16 arranged to deliver open-ended, rigid container bodies (can bottoms) 18 to a first location 19 between the rotatable, flexible discs 12, a receptacle 20 position to receive content 22 expelled (flung) from a container 18 as the container 18 is gripped by the flexible discs 12 and rotated about an arcuate path defined by the rotation of the flexible discs 12, and a plow 24 (FIG. 4) at a location underneath the rotatable flexible discs 12 arranged to release the emptied containers 18 from the grip of the rotatable flexible discs 12 to direct them onto an exit chute (rails) 26. Preferably, the flexible discs 14 are constructed from a fiber reinforced neoprene or from urethane.

Figure 2:
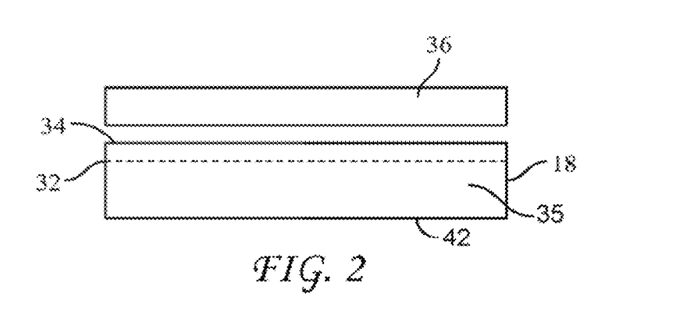
FIG. 2 is a side view of an exemplary container for a smokeless tobacco.

Referring now to FIG. 2, in an exemplary embodiment, the rigid container body 18 may comprise a can bottom 32 for a smokeless tobacco product, where the can bottom 32 has an open end portion 34 through which a unit of smokeless tobacco 35 is deposited during loading operations. During lidding operations, a lid 36 is fitted upon the upper edge portion 34 of a loaded can bottom 32 and pressed into a position of full closure. If a particular can bottom 32 has been loaded with a unit of smokeless tobacco and the loaded can bottom 32 fails to meet a weight check or the like, it is routed to the apparatus shown in FIG. 1 for reclamation, instead of proceeding to the lidding station.

It is to be understood that the teachings herein are in reference to a smokeless tobacco product comprising can filled with MST, snus or pipe tobacco or other form of tobacco products; however the teachings are applicable to open-ended, rigid bodies of any type, wherein a need arises to separate the rigid body from its content in a manner that facilitates reclamation (re-use) use of the rigid container and/or its content. It is also contemplated that the rigid body 18 may differ in shape from the discus shape of the container bottom 32 of the exemplary embodiment. The container bottom 32 of the exemplary embodiment has the dimensional characteristic of a diameter, whereas for rigid container bodies of a more rectangular shape, the corresponding characteristic dimension may comprise a width: but for purposes of this disclosure, reference to a "diameter" in these teachings shall also be applicable rigid containers of a more rectangular shape and having a "width".

Figure 3A:
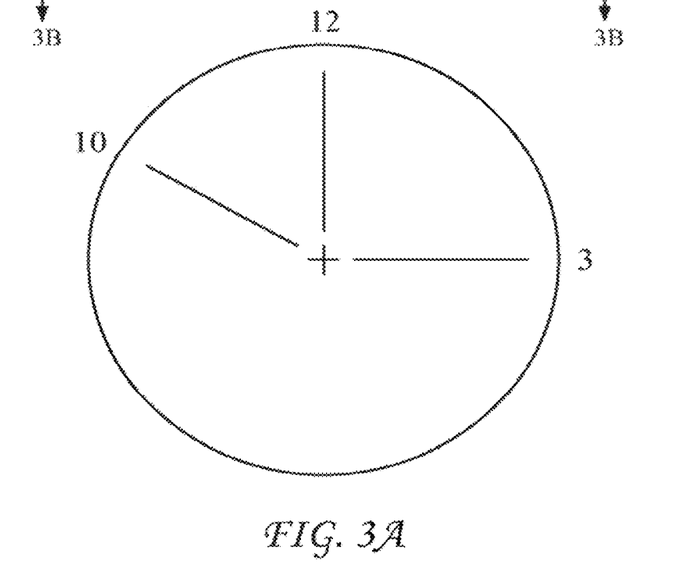
FIG. 3A is a clock face representation of positions referenced with respect to the flexible rotating disks of the embodiment of FIG. 1.

Referring now also to FIGS. 1 and 3A, it is noted that the clock positions represented in FIG. 3A are set forth in a clockwise sense, but the flexible discs 12 rotate in the counterclockwise direction as viewed in the drawing. A procession of loaded, nonconforming container bodies 18 are moved into a first location 19 at a 12 o'clock position between the rotatable flexible discs 12 by the conveyor 16. The 12 o'clock position is preferred in that it helps avoid canting of the filled containers 18 that might otherwise cause spills of content.

Figure 3B:
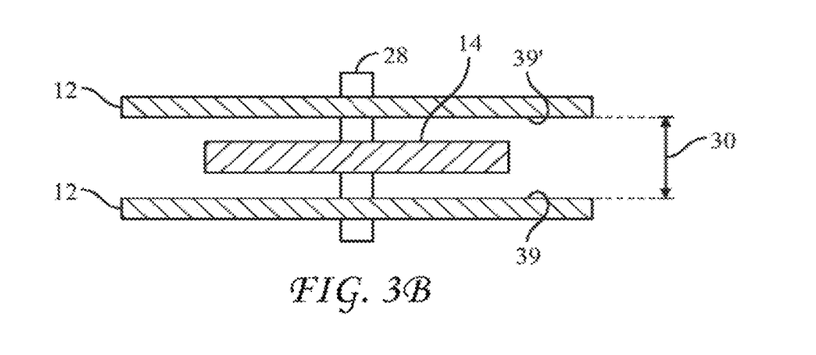
FIG. 3B a top view representation of the rotatable, flexible discs and the stabilizer disc of the embodiment of FIG. 1 but with the rotatable, flexible discs being in a relaxed, un-deflected condition.
Figure 3C:
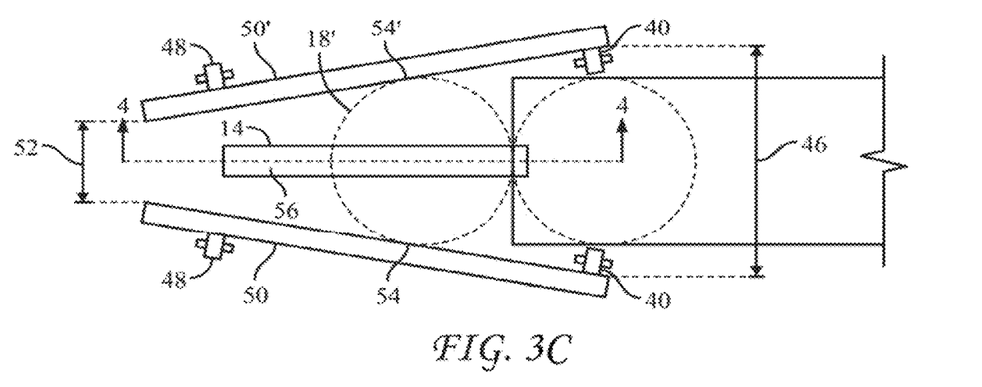
FIG. 3C is a top view representation of the rotatable, flexible discs and the stabilizer disc of the embodiment of FIG. 1, but with the rotatable flexible discs in a deflected condition, together with a representation of containers of FIG. 2 being moved into a first location between the rotatable flexible discs.

Referring now to FIGS. 1, 3B and 3C, in the exemplary embodiment, the pair of rotatable flexible discs 12 and the stabilizer disc 14 are coupled to a common drive shaft 28. Preferably, the opposing, inside surfaces 39, 39' of the rotatable flexible discs 12 are spaced apart from one another by a distance proximate of the diameter (or a transverse characterizing dimension 30) of the container 18 when the flexible discs 12 are in a relaxed state (free of deflection from guides in accordance with the teachings which follow). This spacing and the relaxed state is represented in FIG. 3B. In the case of a rigid container comprising a can bottom 32 of smokeless tobacco, the transverse dimension 30 comprises its diameter. In the case of a more rectangular container, the transverse dimension 30 may comprise its width.

Figure 4:
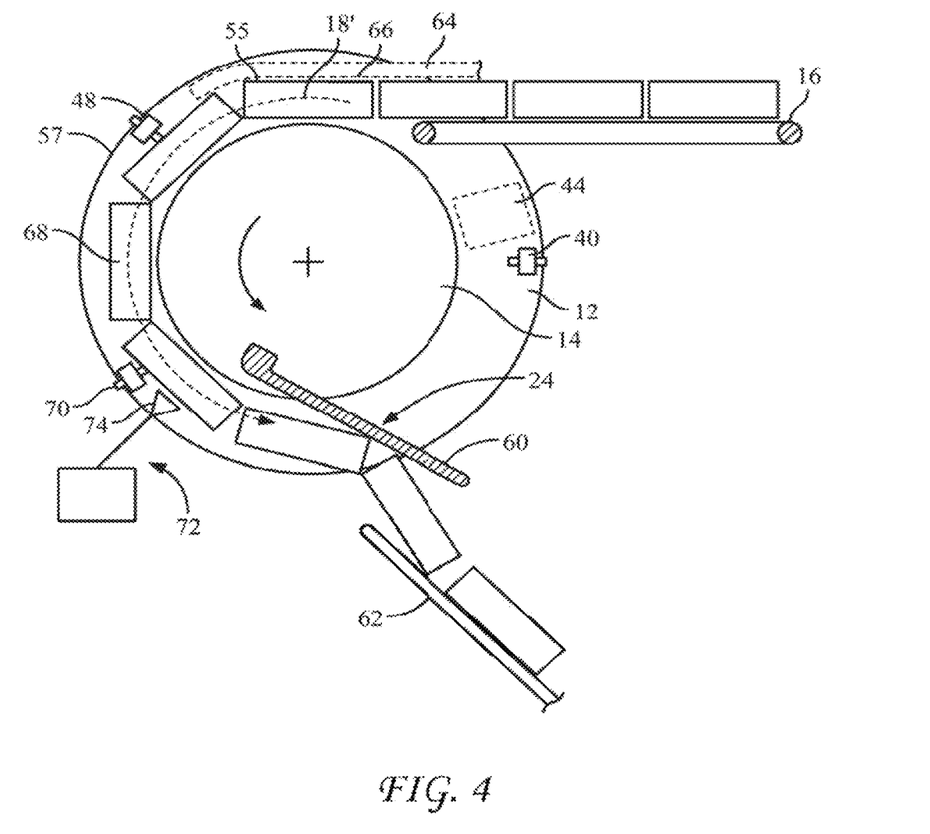
FIG. 4 is a side view of a flexible disk and the stabilizer disc as viewed from arrows 4-4 in FIG. 3C.

Referring now to FIGS. 3A, 3C and 4, at approximately the 3 o'clock position of the rotatable flexible discs 12, a first pair of guide rollers 40 are operative upon the opposing, inside surfaces 39,39' of the discs 12 so as to spread apart (outwardly deflect) opposing outer portions 44 of the flexible discs 12 as the opposing outer portions 44 are rotated through the 3 o'clock position. Preferably, the first guide rollers spread the opposing outer portions 44 apart by a distance 46 greater than the diameter 30 of the container body 18. In an embodiment, for a can of approximately 65 mm diameter, the total spread may be of approximately 6 mm (approximately a 3 mm deflection of each disc).

At approximately the 10 o'clock position of the rotatable flexible discs 12, a second set of guide rollers 48 are operative upon outside surfaces 50,50' of the rotatable flexible discs 12 to urge the outer portions 44 of the rotatable flexible discs 12 towards one another as the opposing outer portions 44 are rotated through the 10 o'clock position. Preferably, the second guide rollers 48 converge (deflect inwardly) the opposing outer portions 44 to a establish a distance 52 between the discs not greater than the diameter 30 of the container body 18 and preferably less, but in all cases by an amount sufficient to hold (grip) the container body 18 between the opposing outer portions of the flexible discs 12 as they rotate from the 12 o'clock position, through the 10 o'clock position and beyond. In an embodiment, for a can of approximately 65 mm diameter, the total convergence may be of approximately 5 to 6 mm (approximately a 2.5 to 3 mm inward deflection of each disc)

Referring now specifically to FIG. 3C, the conveyor 16 extends between the flexible discs 12 adjacent the 12 o'clock position of the rotatable flexible discs 12, so as to convey a leading container body 18' into a position and orientation at the 12 o'clock position where its open end portion 34 is oriented radially outwardly with respect to the flexible discs 12 and where an outer peripheral edge portion 56 of the stabilizer disc 14 may contact a bottom surface 42 of the leading container body 18' to stabilize and help register the container body 18 in the desired aforementioned orientation.

Still referring to FIG. 3C, the angular spacing and the amount of deflection imparted by the first and second guide rollers 40, 48 are such that opposing outer portions 44 of the flexible discs 12 converge as they move from the 3 o'clock position to the 10 o'clock position such that they converge into contact with opposite side portions 54, 54' of the leading container body 18' which has been positioned at the 12 o'clock position between the flexible discs 12 as described above. As a result, a pinching action is initiated at or adjacent to the 12 o'clock position upon opposite side portions 54, 54' of the container body 18' to allow the flexible discs 12 to draw the leading the container body 18' away from the 12 o'clock position and the conveyor 16.

The gripping action tends to increase as opposing outer portions 44 of the flexible discs 12 move from the 12 o'clock position to the 10 o'clock position such that the container body 18 remains fixed and oriented radially outwardly as previously described. The rotational speed imparted to the gripped container body 18 by the flexible discs 12 is such that by the 9 o'clock position the contents 35 of the can is expelled into a bin (receptacle) 20. In an embodiment the receptacle 20 may be open ended so that its content may be directed to a recycling operation or instead may be closed so as to collect content from the multiple container bodies 18 as a batch for subsequent recycling or disposal depending on the nature of the product.

Preferably, the gripping action of the flexible discs 12 and the stabilizing effect of the stabilizer disc 14 continues beyond the 9 o'clock position to maintain the container body 18 in its orientation until its arrival at or about the 6 o'clock position. At or about the 6 o'clock position, a pair of stripper bars (plows) 60 strip the approaching container body 18 out of contact with the flexible discs 12 and onto an exit chute 62. Preferably, each stripper bar 60 extends in a space between each flexible disk 12 and the stabilizer disk 14 and partially into the radial extent of the stabilizer disk 14. Upon being stripped each container body 18 is further moved in an inverted orientation along rails 62 of the chute 26 by gravity and/or a pushing action imparted by the train of the container bodies 18 preceding it or by an exit conveyor or by a combination of any of the above.

Referring now also to FIG. 4, a rail or finger 64 may be provided at or about the 12 o'clock location of the flexible discs 12 in a spaced relation to the stabilizing disk 14 to further assure proper registration of a leading container body 18' at the 12 o'clock position. The stabilizing finger 64 is preferably spaced radially apart from the peripheral edge 56 of the stabilizer disc 14 such that an inner surface 66 of the stabilizing finger 64 may slidingly receive (contact) an upper edge portion or rim 55 of the leading container body 18' as it arrives at the 12 o'clock position. Preferably the surface 66 is spaced from the stabilizer disc 14 by several millimeters greater than the height of the container body 18. In an embodiment, the distance between the rail and the stabilizing disk 14 and the finger 64 progressively increases between the 12 o'clock position and the 10 o'clock position such that upon advance of a gripped container body 18' beyond the 12 o'clock position, there is increased clearance between the rail 64 and the rim 55 of the container body 18'. In other embodiments, the rail 64 may take the form of a blade or a hollow wire.

Preferably, when a container body 18 is in the grip of the rotatable flexible discs 12, the upper edge or rim 55 of the container body 18 lies wholly inside of the peripheral edge 57 of the rotatable flexible discs 12. More preferably, the rim 55 of the gripped container body 18 is radially spaced (recessed) from the peripheral edge 57 of the rotatable flexible discs 12 by a distance determined by the height of the container body 18 and the difference in diameter between the flexible discs 12 and the stabilizer disk 14. In an embodiment, the flexible discs 12 have a diameter of approximately 12 inches and the stabilizer disk 14 has a diameter of approximately 9 inches, although a wide variance of diameters (and relative diameters) are contemplated with regard to the teachings herein. The diameter of the arcuate path 68 of the container body 18 as it travels from the 12 o'clock position to the 6 o'clock position of the rotatable flexible discs 12 correlates with the diameter of the stabilizer disk 14.

Still referring to FIG. 4, preferably, the rotational speed of the flexible discs 12 at the 12 o'clock position is greater than the linear speed imparted to an incoming, filled container body 18 by the conveyor 16, such that each leading container body 18' is accelerated away from the 12 o'clock position by the flexible discs 12. Such arrangement avoids accumulation of filled container bodies 18 along the conveyor 16. In addition, it is preferable to rotate the flexible discs 12 as fast as possible, which promotes a flinging effect upon contents 35 of the containers 18 at and about the 9 o'clock position. It is also preferable to make the diameter of the arcuate path 68 of gripped container bodies 18 as small as possible, which also promotes the fling effect, which in turn promotes a complete removal of the content 22.

For example, and might be a container body 18 might have height (depth) of 2⅝ inches and a diameter of 75 mm, and might be loaded at a rate of 450 cans per minute or at a at a rate of 800 cans per minute, the diameter of the flexible discs 12 may be in the range of approximately 8 to 14 inches and its speed in the range of approximately 120 to approximately 280 revolutions per minute. These speeds help establish a capacity the apparatus to accept the entire output of the loading machine, which circumstance may arise at times of machine startup and other instances. Preferably, the flexible discs 12 are rotated continuously during manufacturing operations. The speed of rotation may also be selected based upon the nature of the contents to be expelled. If the content is not tacky and/or of low moisture, a lower rotational speed may be adequate and selected to minimize impact upon the content. A tacky content may require a higher speed of rotation to assure consistent and complete removal.

Still referring to FIG. 4, the continuous nature of how container bodies 18 are received between the opposing portions of the flexible discs 12 at its 12 o'clock position from the continuously driven conveyor 16 contributes a capacity of the apparatus to receive and process a stream (procession) of filled container bottoms 18 regardless of the spacing or the lack of spacing between members of the stream of filled container bodies 18.

In an embodiment, a third pair of guide rollers 70 may be added at approximately the 8 o'clock position of the flexible discs 12, in addition to the second pair of guide rollers 48 to assure adequate and continued gripping action of the flexible discs 12 throughout the arcuate path 68 of the gripped container bodies 18. The third pair of guide rollers 70 may be desired in the instance of larger container bodies 18 and/or heavier content 35.

In an embodiment, the stabilizer disk 14 is preferably keyed onto the driveshaft 28 such that it remains centered relative to the intended path of the container bodies 18. Preferably adjustable locking rings located on each side of each flexible disc 12 holds each flexible disk 12 in place along the drive shaft. Accordingly, the distance between the flexible discs 12 may be adjusted to accommodate differences in container size.

In addition, preferably, the locations of guide rollers or guides 40, 48 and 70 with respect to the arcuate path 68 are adjustable such that the deflection of the rotatable flexible discs 12 can be adjusted to optimize operation and to accommodate changes in product size or configuration. In an embodiment, one or more of the guides 40, 48 and 70 and the plows 60 are supported from a common frame member and the common frame member includes a rotationally adjustable mount such that all of the aforementioned components can be rotated together relative to the arcuate path 68 to facilitate tuning of the apparatus 10 to a particular product size and shape and/or a particular speed of operation.

In an embodiment, the apparatus 10 includes a cleaning station 72 comprising an air jet nozzle or water jet nozzle 74 directed to the open end portion 34 of a container body 18 just upstream of the plow 60. The cleaning station 72 may be supplemented with an inspections station (not shown) to determine whether any content 35 has remained with the emptied container body 18.

Figure 5:
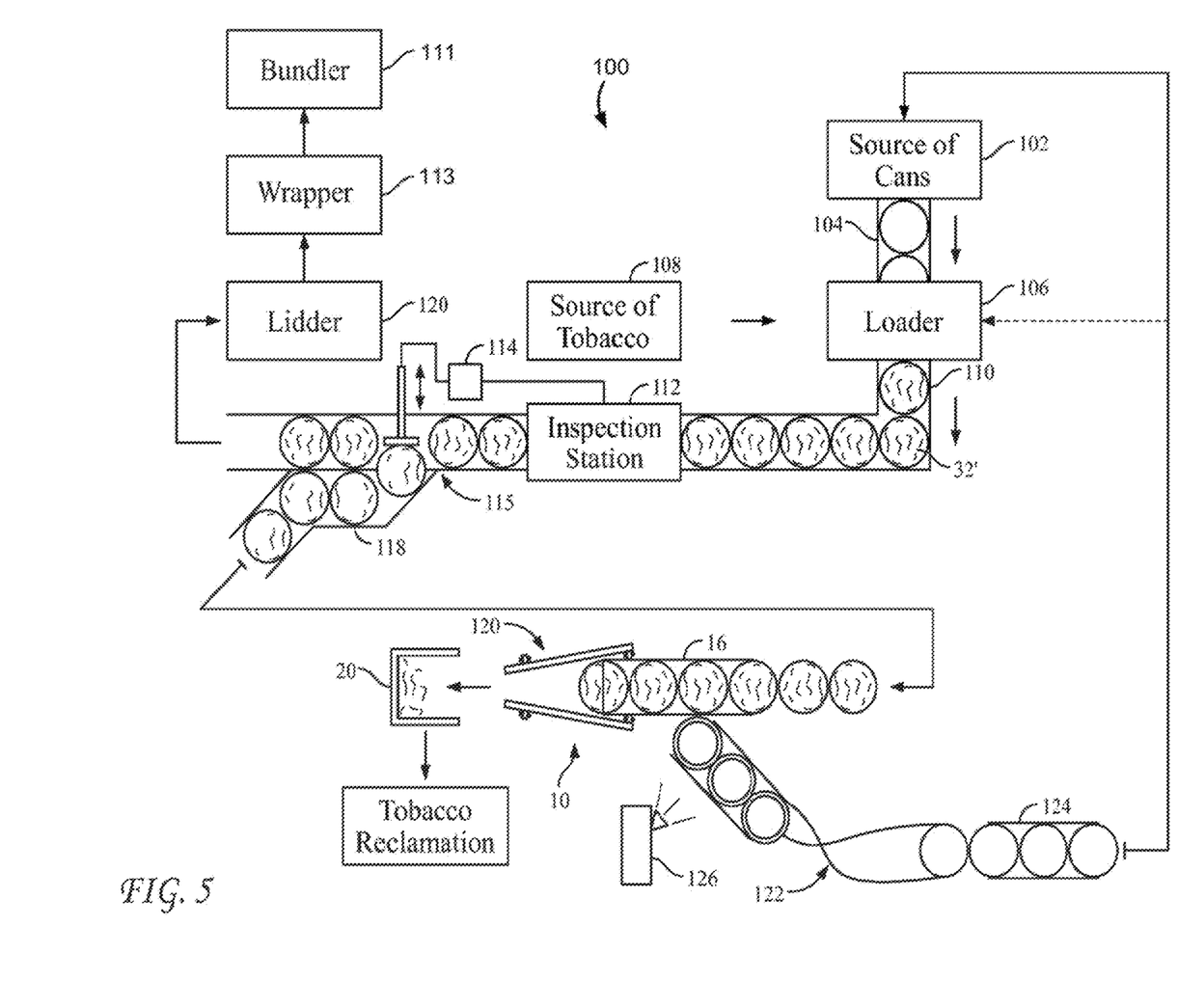
FIG. 5 is a representation of a manufacturing system comprising the apparatus of FIG. 1.

Referring now to FIG. 5, an exemplary system 100 is provided which includes various stations for the automated production a product such as cans of smokeless tobacco wherein content 36 is loaded into can bottoms 32. The system further comprises a reclamation station comprising the apparatus 10 constructed in accordance with the embodiments previously described.

In the exemplary system 100, a source 102 of empty can bottoms establishes a procession 104 of empty can bottoms 32 by an inclined rail or driven conveyor to a loader (canner) 106, where tobacco from a source 108 is loaded into each of the empty can bottoms 32 to produce a procession 110 of filled can bottoms 32', which procession 110 is directed through an inspection station 112. At the inspection station 112 each filled can bottom 32' is tested for meeting a predetermined criteria such as a range of acceptable weight or other specification.

If found to meet the criteria, the filled cans 32 are allowed to progress to a lidder 120 where a stream of lids 38 are joined with and closed upon each of the loaded can bottoms 32'. Thereafter the output of the lidder 110 is directed to a wrapper 113 wherein labels and the like are applied, and thereafter to a bundler 111 wherein product is bundled and placed in packs and cases as the case may be for the particular product line being packed.

If the criterion is weight, a suitable check weigher device for the inspection station 112 may be obtained from Mettler Toledo High-Speed Inc. of New York.

If a filled can bottom 32' is found not to meet the criteria, the inspection station 112 generates a signal indicative that tested can bottom 32' is out of specification, which signal is directed to a controller 114 which is configured to operate a rejection station 115 responsively to the signal at a time when the out of specification can bottom 32" arrives at the rejection station 115. In an embodiment, operation of the rejection station 115 removes the rejected can body 32" from the procession 110 of filled can bodies 32' with a pneumatic plunger or moveable gate onto a separate conveyor 118. The conveyor 118 leads to a reclamation station 120 comprising an automated separation apparatus 10 constructed in accordance with any of the embodiments previously described. At the apparatus 10, the conveyor 118 may deliver rejected can bottoms 32" to the 12 o'clock position of the opposing flexible discs 12 in a manner such as previously described with respect to conveyor 16 or alternatively, may feed the filled but rejected can bottoms 32" to the conveyor 16.

At the reclamation station 120, the apparatus 10 is operative to separate content 36 from the can bottom 32' as previously described, whereupon emptied can bottoms 32' are discharge from the separating apparatus 10 in a cup down orientation. Thereafter, they are inverted at a location 122 into a cup-up orientation and delivered by a return conveyor 124 to the source of cans 102 or directly to the loader 106. In an embodiment, the reclamation station may further comprise a cleaning station 126 which directs a jet of air or a jet of water or both to clean a surface of an emptied can bottom 32. Preferably the cleaning station would be operative upon emptied cans 32 while they remain in their inverted orientation (cup-down) such as along the path of the chute 62 or at a location upstream of the location 122 where the emptied can bottoms 32 are inverted to a cup-up orientation. The cleaning station 126 may be supplemented with an inspections station to assure cleanliness of the emptied can bottoms 32'.

The tobacco content that is expelled into the receptacle 20 may be directed either continuously or in batches to a tobacco reclamation unit for processing and/or sorting before being returned to the source of tobacco 108 of a loader 106.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed:

1. A system configured to promote re-utilization of a rejected container loaded with content, the system comprising:
    an inspection station configured to generate a signal when a filled container fails to meet a specification;
    a rejection station responsive to the signal; and
    a reclamation station configured to receive and expel content from the filled container that fails to meet the specification so as to form a first output of expelled content and a second output including an empty container, the reclamation station including,
    a pair of rotating flexible discs, and
    a continuous feed mechanism configured to feed the filled container that fails to meet the specification to a first location between the pair of rotating flexible discs, the pair of rotating flexible discs configured to grip and to rotate the filled container that fails to meet the specification beyond the first location so as to expel content from the filled container.

2. The system of claim 1, wherein the specification comprises a weight of the filled container.

3. The system of claim 1, wherein the pair of rotating flexible discs cooperate with a stabilizer so as to maintain an orientation of the filled container while being gripped by the pair of rotating flexible discs.

4. The system of claim 3, wherein the stabilizer comprises:
    a stabilizer disc, the stabilizer disc between and rotatable with the pair of rotating flexible discs.

5. The system of claim 4, wherein the stabilizer disc has a diameter less than a diameter of the pair of rotating flexible discs.

6. The system of claim 4, wherein the stabilizer disc and the pair of rotating flexible discs are coupled to a common drive shaft.

7. The system of claim 4, wherein the stabilizer comprises:
    a concentric ring on an inside surface of at least one of the pair of rotating flexible discs.

8. The system of claim 7, wherein the stabilizer further comprises:
    a finger extending between the pair of rotating flexible discs.

9. The system of claim 1, wherein the pair of rotating flexible discs are spaced apart from one another by a distance proximate to a diameter of the filled container when in a relaxed state.

10. The system of claim 1, wherein the pair of rotating flexible discs include fiber reinforced neoprene, urethane, or both fiber reinforced neoprene and urethane.

11. The system of claim 1 further comprising:
    a cleaning station configured to clean a surface of the empty container before arrival at a source of containers.

12. The system of claim 11, wherein said cleaning station comprises:
- at least one of an air jet, a water jet, or both an air jet and a water jet.

13. The system of claim 1, further comprising:
- a receptacle configured to receive the first output.

14. The system of claim 1, wherein the filled container comprises a bottom portion of a can filled with smokeless tobacco.

15. The system of claim 1, further comprising:
- a first pair of guide rollers configured to spread apart outer portions of the pair of rotating flexible discs.

16. The system of claim 15, wherein the outer portions of the pair of rotating flexible discs are spaced apart by a distance greater than a diameter of the filled container.

17. The system of claim 15, wherein the outer portions of the pair of rotating flexible discs are spaced apart by a distance of 6 mm.

18. The system of claim 15, further comprising:
- a second pair of guide rollers configured to urge the outer portions of the pair of rotating flexible discs together so as to grip the filled container between the outer portions of the pair of rotating flexible discs.

19. The system of claim 18, further comprising:
- a pair of stripper bars configured to strip the emptied container out of contact with the pair of rotating flexible discs after the emptied container has been gripped.

* * * * *